(12) United States Patent
Biskeborn

(10) Patent No.: US 9,799,365 B2
(45) Date of Patent: Oct. 24, 2017

(54) MAGNETIC TAPE APPLIANCE WITH SELECTABLY ALWAYS-LEADING HEAD ASSEMBLIES

(71) Applicant: International Business Machines Corporation, Armonk, NY (US)

(72) Inventor: Robert G. Biskeborn, Hollister, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/599,589

(22) Filed: May 19, 2017

(65) Prior Publication Data

US 2017/0256282 A1     Sep. 7, 2017

Related U.S. Application Data

(62) Division of application No. 14/920,931, filed on Oct. 23, 2015.

(51) Int. Cl.
*G11B 15/66* (2006.01)

(52) U.S. Cl.
CPC ................... *G11B 15/662* (2013.01)

(58) Field of Classification Search
None
See application file for complete search history.

(56) References Cited

U.S. PATENT DOCUMENTS 5,331,493 A  7/1994 Schwarz
6,690,542 B1  2/2004 Wang
6,972,931 B2  12/2005 Rudi et al.
7,342,738 B1  3/2008 Anderson et al.
8,009,377 B2  8/2011 Neumann
(Continued)

FOREIGN PATENT DOCUMENTS

DE     19847425 A1    8/1999
GB     1120085 A  *  7/1968  ............. G11B 5/024
(Continued)

OTHER PUBLICATIONS

Pending U.S. Appl. No. 14/920,931, filed Oct. 23, 2015, entitled: "Magnetic Tape Appliance With Selectably Always-Leading Head Assemblies", pp. 1-30.
(Continued)

*Primary Examiner* — Will J Klimowicz
(74) *Attorney, Agent, or Firm* — David Zwick

(57) ABSTRACT

A tape appliance includes first and second tape head modules, and a guide surface with first and second slots. The guide surface is configured such that the as the tape moves in first and reverse directions of longitudinal tape travel, the tape wraps about the guide surface, and at least two non-overlapping wrap positions of the tape engage the first slot, and at least one wrap position of the tape engages the second slot. When the tape travel is in the first longitudinal direction, the first and second tape head modules are positioned within the first and second slots, respectively, such that the first tape head module is the leading module. When the tape travel is in the reverse longitudinal direction, the first and second tape head modules are positioned within the first and second slots, respectively, such that the first tape head module remains the leading module.

2 Claims, 7 Drawing Sheets

(56) References Cited

U.S. PATENT DOCUMENTS

| | | |
|---|---|---|
| 8,054,579 B2 | 11/2011 | Biskeborn |
| 8,862,265 B2 | 10/2014 | McClelland |
| 2002/0186496 A1 | 12/2002 | Saliba et al. |
| 2004/0085682 A1 | 5/2004 | Jang et al. |
| 2004/0238671 A1 | 12/2004 | Brown et al. |
| 2006/0098350 A1 | 5/2006 | Hamidi |
| 2006/0181812 A1 | 8/2006 | Kwon et al. |
| 2008/0273278 A1 | 11/2008 | Iben |
| 2009/0141389 A1 | 6/2009 | Saliba |
| 2011/0002065 A1* | 1/2011 | Dugas .................. G11B 15/607 360/77.12 |
| 2013/0258519 A1 | 10/2013 | Poorman et al. |
| 2014/0029135 A1 | 1/2014 | Koeppe |
| 2014/0327983 A1 | 11/2014 | Biskeborn et al. |
| 2014/0347766 A1 | 11/2014 | Biskeborn et al. |
| 2017/0117013 A1 | 4/2017 | Biskeborn |

FOREIGN PATENT DOCUMENTS

| | | |
|---|---|---|
| JP | 57123556 A | 8/1982 |
| WO | 9613833 A1 | 5/1996 |
| WO | 9617342 A1 | 6/1996 |
| WO | WO 2009094516 A1 * | 7/2009 ........... G11B 15/607 |

OTHER PUBLICATIONS

Zhong et al., "H2 Model Matching Feedforward Control for Tape Head Positioning Servo Systems", 2013 American Control Conference (ACC), Washington, DC, USA, Jun. 17-19, 2013, pp. 4504-4509, © 2013 AACC.

Soda, "Modeling Electrostatic Discharge Affecting GMR Heads," IEEE Transactions on Industry Applications, vol. 43, No. 5, Sep./Oct. 2007, Copyright 2007 IEEE, pp. 1144-1148.

Pending U.S. Appl. No. 14/920,944, titled "Monolithic Tape Head and Actuator for High Density Recording," filed Oct. 23, 2015, pp. 1-33.

Pending U.S. Appl. No. 14/920,936, titled "Dual-Path Flex Circuit," filed Oct. 23, 2015, pp. 1-25.

* cited by examiner

MAGNETIC TAPE APPLIANCE WITH SELECTABLY ALWAYS-LEADING HEAD ASSEMBLIES

BACKGROUND

The present invention relates generally to the field of magnetic information storage and retrieval, and more particularly to a tape appliance with always leading and/or always trailing head assemblies.

A typical approach for enabling higher data rates in magnetic tape technology is by adding active channels to the tape heads. However, this approach is becoming increasingly difficult to implement as heads, flex circuits, and electronics become more and more congested due to the need for packaging more I/O into the limited space of the head and head assembly. Typical solutions to this issue have included implementing head modules having a reduced footprint, along with associated cabling, connections, connectors, and ASICs. Disadvantages of this approach may include increased complexity and component cost, and lower yields and reliability. A need for redundant magnetic transducers for enabling read-verification during writing may further result in difficulties meeting packaging, electronic, and thermal requirements. For example, a tape drive with 16 active channels, such as a typical tape drive operating in accordance with Linear Tape-Open sixth generation (LTO-6), may contain 16 writer and 16 reader transducers in each of two head modules for bidirectional read-while-write operation, thus containing 64 channels and illustrating 2× redundancy. Achieving higher data rates, for example, by increasing the number of active channels to 64 while maintaining 2× redundancy, results in increasing the number of writer and reader transducers to 64 on each of two heads, resulting in 256 channels. Such a head assembly requires 256 pairs of I/O bonding pads. Given the space constraints in the current form factor products, this may present challenges in routing the wire bond leads, increased on-chip lead lengths and resistances, heat generation, and production yield. Cabling such a structure via conventional copper flex circuits may present additional challenges.

BRIEF SUMMARY

Embodiments of the present invention disclose a tape appliance with selectably always-leading head assemblies. The tape appliance includes a first tape head module, a second tape head module, and a guide surface that includes first and second slots. The first and second tape head modules are disposed within the first and second slots, respectively, for engaging the tape. The guide surface is configured such that the as the tape moves in first and reverse directions of longitudinal tape travel, the tape wraps about the guide surface, and at least two non-overlapping wrap positions of the tape engage the first slot, and at least one wrap position of the tape engages the second slot. When the tape travel is in the first longitudinal direction, the first and second tape head modules are positioned within the first and second slots, respectively, such that the first tape head module is the leading module. When the tape travel is in the reverse longitudinal direction, the first and second tape head modules are positioned within the first and second slots, respectively, such that the first tape head module remains the leading module.

DETAILED DESCRIPTION

Embodiments of the invention are generally directed to a magnetic tape appliance having at least a writing module and a separate reading module that can be arranged for read-verifying after writing for tape motion in either direction. This function is accomplished by altering tape wrap around at least one of the reading or writing modules, such that for both directions of tape motion, one of the modules is always the leading, or upstream, module, and the other module is always the trailing, or downstream, module. This may be implemented, for example, by altering the position of the tape, for example, via rollers or guides, and/or one or both of the modules, based on the direction of tape motion. Various embodiments of the invention include mechanisms and/or structures for altering the position between a primarily writing and a primarily reading module, such that their relative positions, in terms of leading and trailing, reverses when the direction of tape motion reverses.

This approach may be advantageous in that the number of reading and writing modules may be reduced, for example, to one each, which may lead to a reduced requirement in the number of reading and writing transducers. This may prove enabling for increasing data throughput through increasing the number of channels by reducing the required number of head modules, cables, ASICS, and other associated components.

Figure 1A:
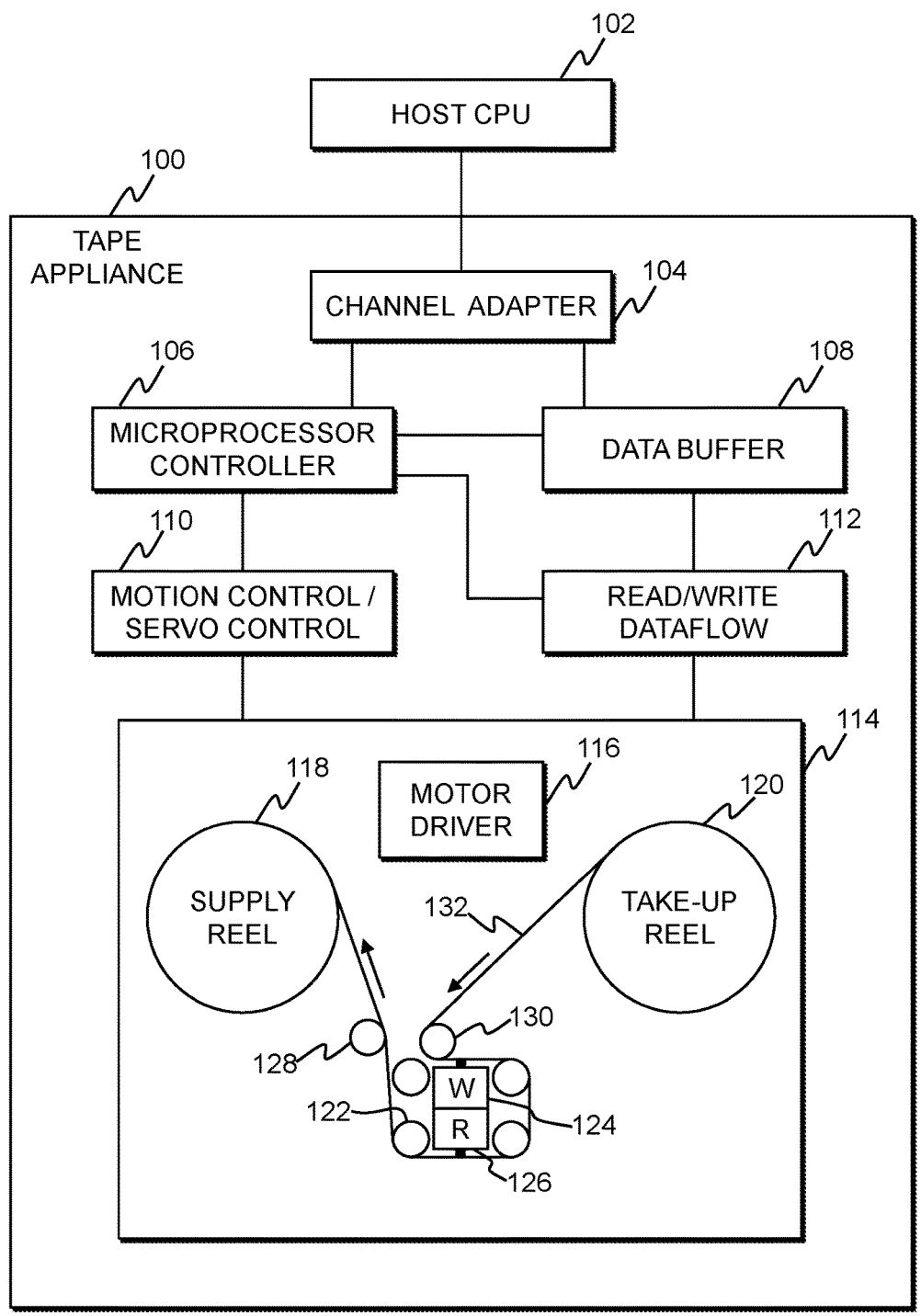
FIG. 1A is a functional block diagram of a tape appliance 100, in accordance with an embodiment of the invention.

FIG. 1 is a functional block diagram of a tape appliance 100, in accordance with an embodiment of the invention. In an exemplary embodiment, tape appliance 100 may be a production tape drive. Tape appliance 100 may include several components providing a control and data transfer system for reading and writing data from a host CPU 102, an embodiment of which is described below in relation to FIG. 5, to a magnetic tape medium. Tape appliance 100 may include a channel adapter 104, a microprocessor controller 106, a data buffer 108, a read/write dataflow circuit 112, a motion control system 110, and a tape interface system 114 described in more detail below.

Microprocessor controller 106 may provide overall control functionality for the operations of all other components of tape appliance 100. The functions performed by microprocessor controller 106 may be programmable via microcode routines according to desired tape drive operational characteristics. During data write operations (with all dataflow being reversed for data read operations), microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuitry 112, which formats the device data into physically formatted data that may be recorded on a magnetic tape medium. Read/write dataflow circuitry 112 is responsible for executing all read/write data transfer operations under the control of microprocessor controller 106. Formatted physical data from read/write dataflow circuitry 112 is communicated to tape interface system 114.

In various embodiments, during read operations, microprocessor controller 106 may receive the unformatted electrical signals from tape interface system 114, either directly or via read/write dataflow circuitry 112. In other embodiments, read/write dataflow circuitry 112 may perform various pre-processing functions on the electrical signals from tape interface system 114, and transmit information that is representative of the electrical signals to microprocessor controller 106. In these embodiments, microprocessor controller 106 may include appropriate electrical circuitry, logic, firmware, software, etc., to perform analysis of the electrical signals or information to determine various characteristics of the signals related to quality of the recorded data and the magnetic medium, in accordance with embodiments of the invention. In general, the appropriate electrical circuitry, logic, firmware, software, etc., to perform analysis of the electrical signals to determine various characteristics of the signals related to quality of the recorded data and the magnetic medium may be located in one or more functional components of a tape appliance, such as tape appliance 100, and/or in a host computer, such as host CPU 102.

In an example embodiment, tape interface system 114 includes a tape medium 132 mounted between a supply reel 118 and a take-up reel 120. Tape 132 is threaded past rollers 128 and capstans 122, which comprises a tape guide assembly, so as to engage a write module 124 and a read module 126 as required. Depending on design considerations, other tape guide elements may be used in place of, or in addition to, rollers 128 and capstans 122, for example, tape pins, tape guides, flanges, etc. Drive motor components (not shown) perform forward and reverse movement of tape medium 132 between supply reel 118 and take-up reel 120. The drive motor components may cause rotational and translational movement of supply reel 118, take-up reel 120, one or more of rollers 128 and 130, one or more of capstans 122, and other tape guide elements that may be present. Those of skill in the art will appreciate that the descriptive embodiment, and alternative embodiments described below, may include additional well known drive and drive related components, such as pinch rollers, tape pins, tape guides, flanges, etc., without departing from the scope and spirit of the invention. For ease of description, these additional drive and drive related components may not be described in the various disclosed embodiments.

The drive motor components of tape interface system 114 are controlled by motion control system 110 and motor driver circuit 116 to execute such tape movements as forward and reverse recording and playback, rewind and other tape motion functions. Movement of components of the tape guide assembly may also be controlled by motion control system 110. In addition, motion control system 110 may control transverse positioning of write module 124 and a read module 126 relative to the direction of longitudinal tape movement in order to read and write data in data tracks on the tape medium 132.

In the embodiment illustrated, rollers 128 and 130 are positioned such that write module 124 is the leading module and read module 126 is the trailing module for the direction of tape travel indicated by the direction arrows adjacent tape 132. Also as illustrated, in this embodiment, roller 128 is optionally positioned such that tape 132 does not engage one of capstans 122, thus reducing wear on the capstan and tape. For tape travel in the opposite direction, rollers 128 and 130 are positioned in a mirrored configuration to the right, as illustrated, such that read module 126 is the leading module and write module 124 is the trailing module. Other embodiments of tape guide elements and tape head modules to enable an always-leading module are described in more detail below.

Figure 1B:
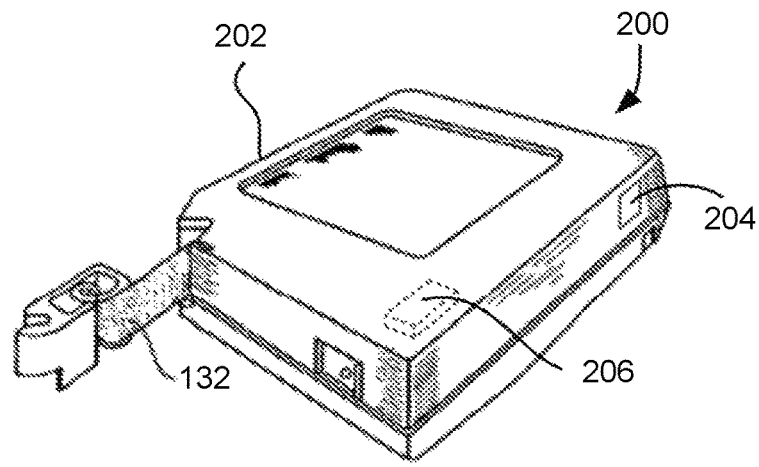
FIG. 1B illustrates an exemplary tape cartridge, in accordance with an embodiment of the invention.

FIG. 1B illustrates an exemplary tape cartridge 200 according to an embodiment of the invention. Tape cartridge 200 may be used with a system such as tape appliance 100 shown in FIG. 1A. As shown, tape cartridge 200 includes a housing 202, a tape 132 in the housing 202, and may include a nonvolatile memory 206 coupled to the housing 202. The nonvolatile memory may be accessible by tape appliance 100, and the tape operating software (the driver software) residing on host CPU 102. In an exemplary embodiment, tape cartridge 200 meets the standards specifications of one or more of the Linear Tape Open (LTO) generations, such as LTO-6. All trademarks used herein are the property of their respective owners. In such an embodiment, supply reel 118 may be integral to the LTO tape cartridge, and the end of tape 132 includes a leader pin (not shown) which is mechanically grasped by features (not shown) of tape interface system 114 and threaded onto take-up reel 120.

Figure 2A:
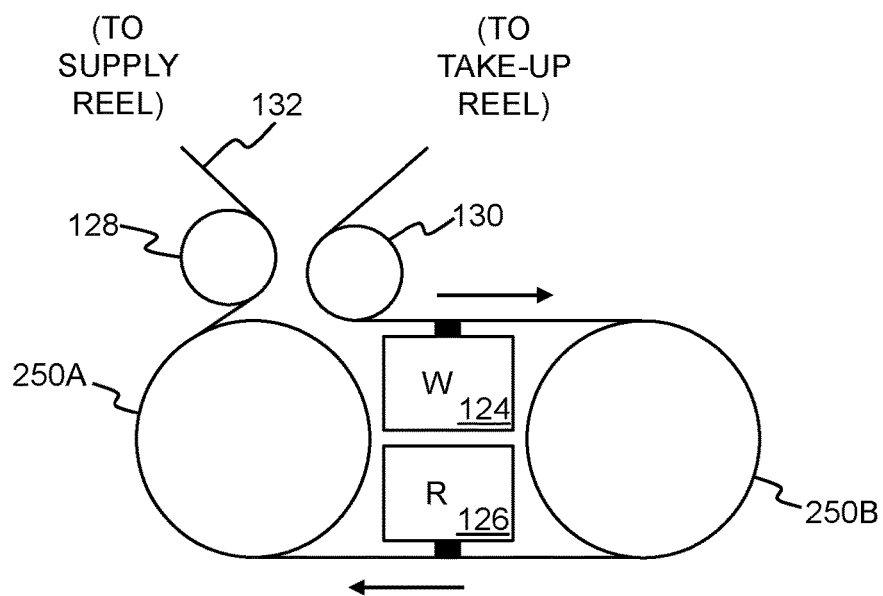
FIGS. 2A, 2B, 2C, and 2D illustrate an arrangement of a tape guide assembly in which a write module will be the leading module, and a read module will be the trailing module, for both directions of tape travel, in accordance with an embodiment of the present invention.
Figure 2B:
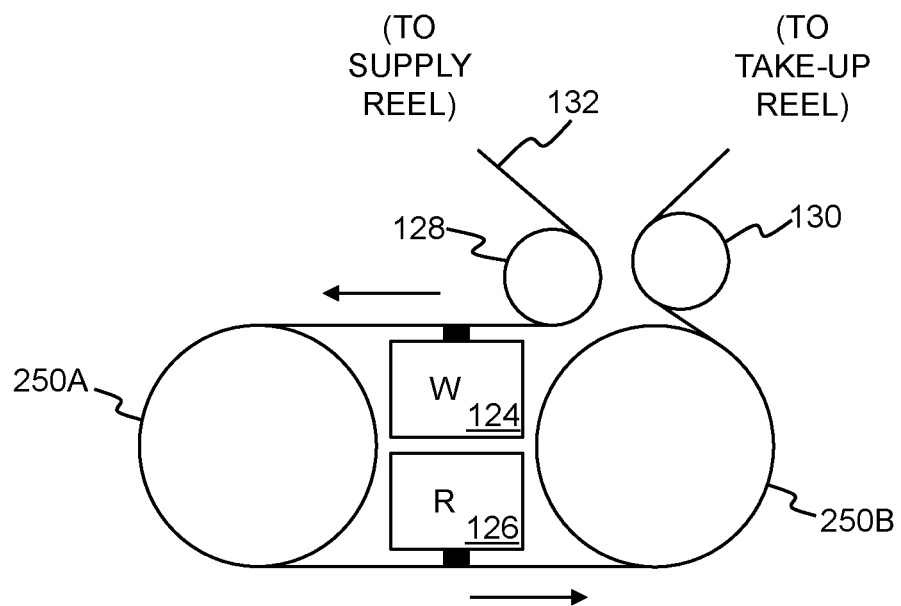
Figure 2C:
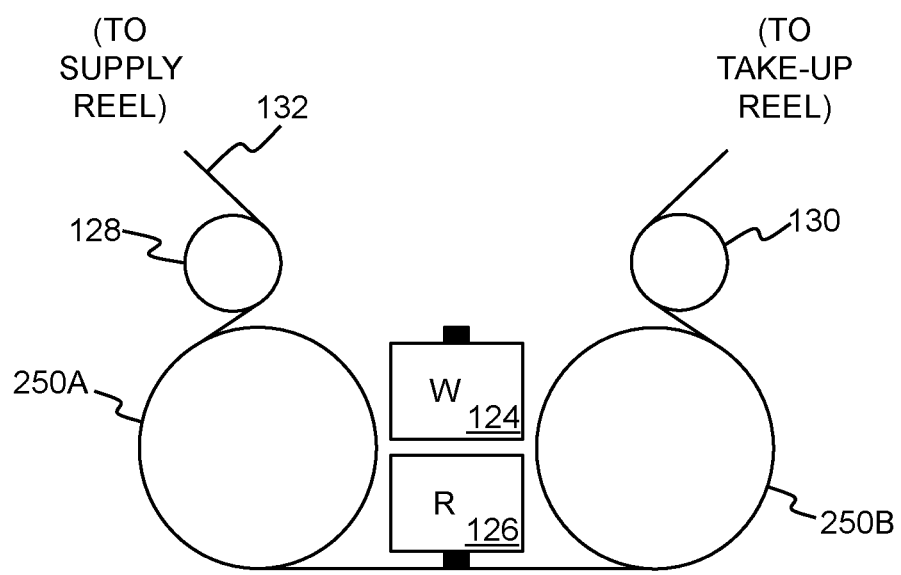

As mentioned above, embodiments of the invention are generally directed to a tape appliance having at least a writing module and a separate reading module that can be arranged for read-verifying after writing for tape motion in either direction. FIGS. 2A, 2B, and 2C illustrate an embodiment in which write module 124 will be the leading module and read module 126 will be the trailing module for both directions of longitudinal tape travel. As illustrated, this may be accomplished by coordinated translational movement of rollers 128 and 130.

FIG. 2A illustrates positioning of rollers 128 and 130 when the tape direction is from take-up reel 120 to supply reel 118. As illustrated, write module 124 is the leading module and read module 126 is the trailing module. When the tape direction reverses, as illustrated in FIG. 2B, rollers 128 and 130 are repositioned such that write module 124 remains the leading module and read module 126 remains the trailing module.

FIG. 2C illustrates an example positioning of rollers 128 and 130 during, for example, load, seek, or read-only operations. As shown, rollers 128 and 130 may be positioned such that tape 132 does not contact write module 124, which, accordingly, is not subjected to tape tribological effects during a read-only operation. Further, read module 126 may be positioned to not engage tape 132 during fast winding operations, such that the read module is not subjected to unneeded contact with the tape during fast seek or rewind operations. Such tape operations may occur at higher tape speed than if read module 126 engages tape 132 during these operations.

Figure 2D:
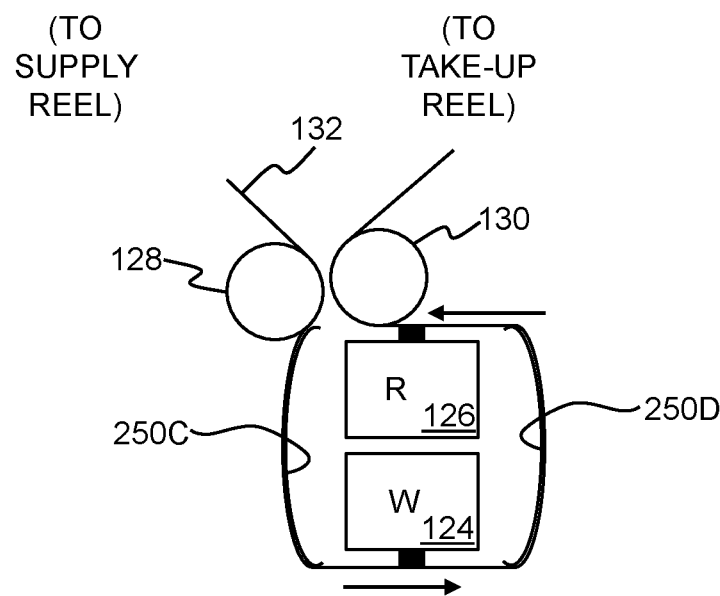

FIG. 2D illustrates an embodiment arranged similar to that of FIGS. 2A-2C. However, rather than rollers 250A and 250B acting as tape guides, flanges 250C and 250D serve this purpose. An advantage to this embodiment may be that the linear tape path between write module 124 and read module 126 may be less than the roller configuration of FIGS. 2A-2C. The geometric arcs of flanges 250C and 250D may be any that satisfy design considerations, such as entry and exit wrap angles, minimum diameters of tape bends, etc. In certain embodiments, the arcs may be formed of portions of Cornu spirals. Also illustrated is that write module 124 and read module 126 are in swapped positions from the configuration of FIGS. 2A-2C, however, write module 124 remains the leading module.

FIGS. 2A, 2B, 2C, and 2D present embodiments illustrating basic implementations of the invention. Those of skill in the art will recognize that numerous modifications may be made to these embodiments within the scope and spirit of the invention. For example, maintaining write module 124 as the leading module as tape direction is reversed may be accomplished by coordinated movement of various combinations of the components of the tape guide assembly, including rollers 130, write module 124, read module 126, capstans 122, and/or other components not illustrated, such as pinch rollers, tape pins, tape guides, flanges, and other tape threading and guiding components. Further, while module 124 is designated as a write module and 126 is designated as a read module, their functions may be switched. Traditional drive components and mechanisms may be used for accomplishing the coordinated movement of the various tape threading and guiding components.

Figure 3A:
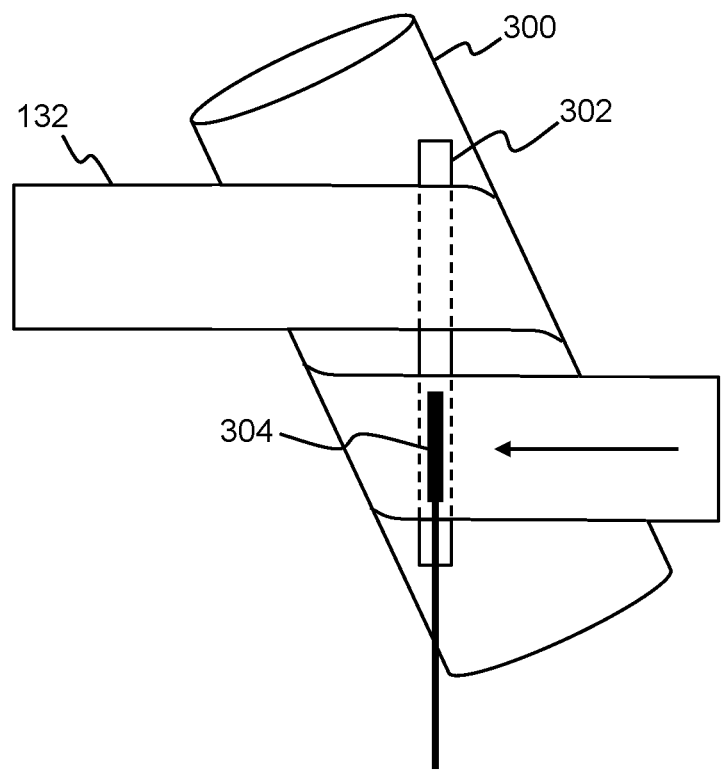
FIGS. 3A, 3B, and 3C illustrate another arrangement of a tape guide assembly in which a write module will be the leading module, and a read module will be the trailing module, for both directions of tape travel, in accordance with an embodiment of the present invention.
Figure 3B:
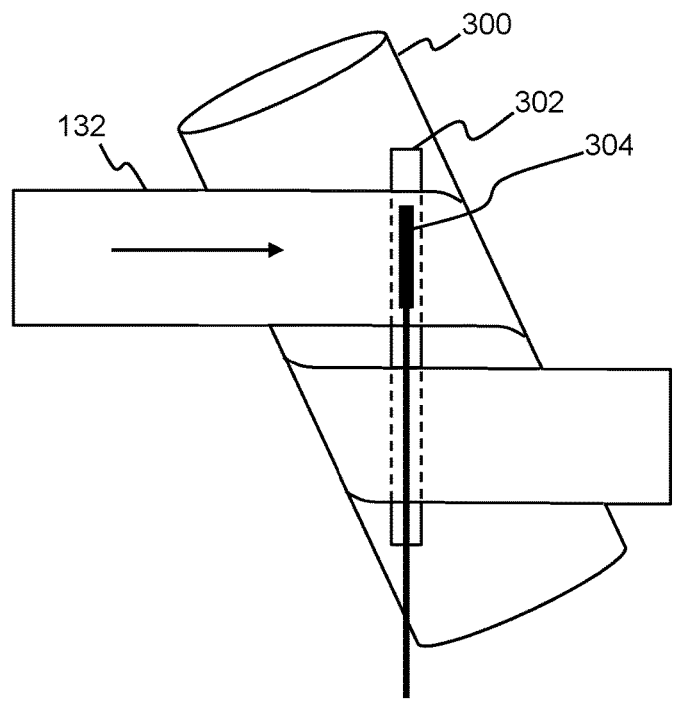
Figure 3C:
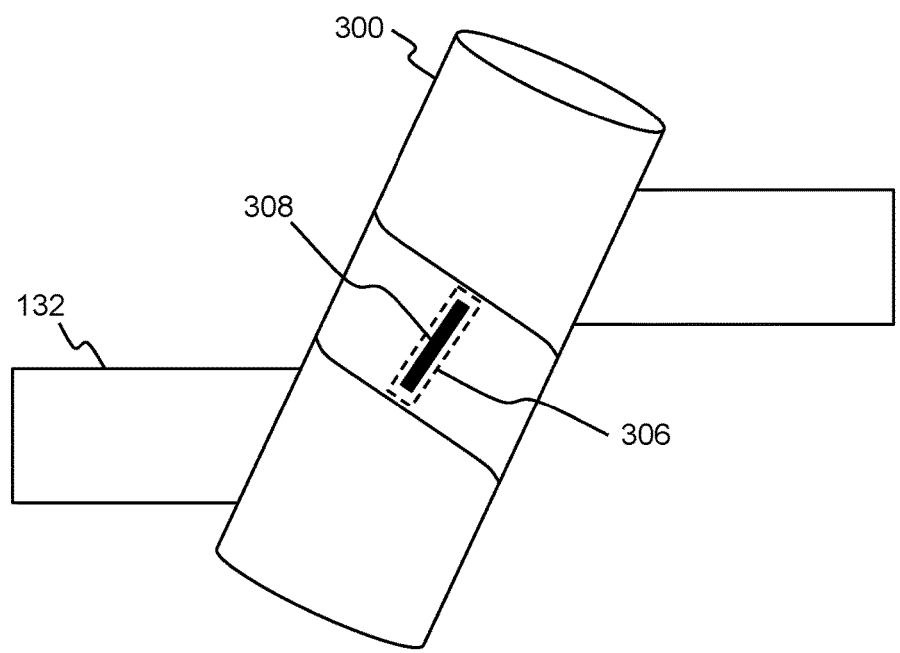

FIGS. 3A, 3B, and 3C illustrate an alternative embodiment in which tape 132 wraps around, or about, cylindrical flange 300, which includes slots 302 and 306. As illustrated in FIGS. 3A and 3B, tape 132 engages slot 302 at upper and lower non-overlapping wrap positions on a front face of flange 300. As illustrated in FIG. 3C, a second slot 306 is on the back face of flange 300, and engages tape 132 on the single crossing wrap on the back front face of the flange. A first tape head module is disposed within slot 302 such that tape head 304 of the module engages tape 132 at the upper or lower wrap positions on the front face of flange 300 as it travels around and past flange 300. Similarly, a tape module that includes tape head 308 is disposed within the back slot 306 of flange 300, and engages tape 132 at the single crossing wrap on the back face of flange 300 as tape 132 travels, in either direction, around and past flange 300. As illustrated in FIGS. 3A, 3B, and 3C, as tape 132 travels around and past flange 300, tape head 304 moves within slot 302 to engage either the upper or lower wrap of tape 132, depending on the tape direction, so as to always act as the leading tape module. Although flange 300 is illustrated as a cylindrical flange, other surface shapes may be used. For example, flange 300 may be formed of a conical shape, a compound surface, for example including saddle surfaces, oval cross sections, or any other combination of surfaces that meet design requirements.

FIGS. 3A, 3B, and 3C present embodiments illustrating basic implementations of the invention. Those of skill in the art will recognize that numerous modifications may be made to these embodiments within the scope and spirit of the invention. For example, maintaining tape head 304 as the leading head as tape direction is reversed may be accomplished by coordinated movement of various combinations of rollers, capstans, pinch rollers, tape pins, tape guides, flanges, other tape threading and guiding components, and/or other components not illustrated. Traditional mechanisms may be used for accomplishing the coordinated movement of the various tape threading and guiding components.

Figure 4A:
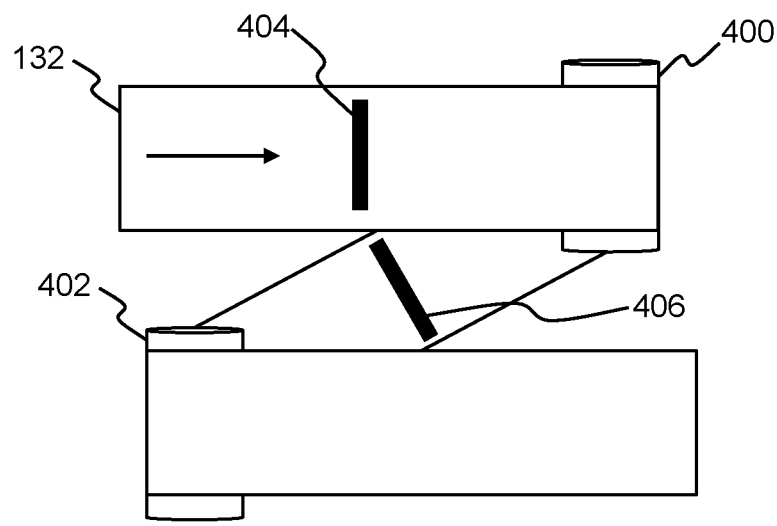
FIGS. 4A and 4B illustrate another arrangement of a tape guide assembly in which a write module will be the leading module, and a read module will be the trailing module, for both directions of tape travel, in accordance with an embodiment of the present invention.
Figure 4B:
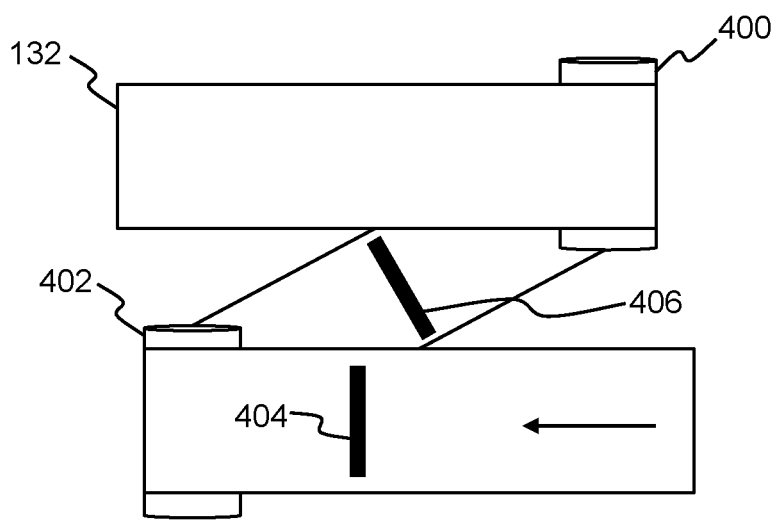

FIGS. 4A and 4B illustrate another alternative embodiment in which tape 132 wraps around rollers 400 and 402, forming upper and lower wraps joined by a crossing wrap. As illustrated, a tape head 404 moves to engage tape 132 at the upper or lower wrap positions, based on the direction of tape 132, as it travels around and past rollers 400 and 402. A second tape head 406 engages tape 132 at the crossing wrap position. As illustrated in FIGS. 4A and 4B, as tape 132 travels around and past rollers 400 and 402, tape head 404 moves to engage either the upper or lower wrap of tape 132, depending on the tape direction, so as to always act as the leading tape module.

FIGS. 4A and 4B present embodiments illustrating basic implementations of the invention. Those of skill in the art will recognize that numerous modifications may be made to these embodiments within the scope and spirit of the invention. For example, maintaining tape head 404 as the leading head as tape direction is reversed may be accomplished by coordinated movement of various combinations of rollers, capstans, pinch rollers, tape pins, tape guides, flanges, other tape threading and guiding components, and/or other components not illustrated. Traditional mechanisms may be used for accomplishing the coordinated movement of the various tape threading and guiding components.

In the exemplary embodiments described above, tape modules, tape heads, head transducers, and other tape appliance components may be designed and configured for various desired characteristics, including performance, size, cable routing, cost, temperature, etc. For example, the leading and trailing edges of the tape heads may be designed for optimal skiving and fly height. Design considerations may include the length of the span of tape between the leading edge of the writing module and the previous supporting roller, guide, etc. Arranging the tape support and drive mechanisms so as to keep this length short, or otherwise "tuning" the length, may reduce the impact of disturbances due to longitudinal sound wave generation in the tape caused by scrapping on the writing skiving edge and resonating in the free span of the tape between the supports.

In the exemplary embodiments described above, the read and write heads may likely not be on the same head assembly. As a result, in various embodiments, the distance between the read and write heads may be greater than for a traditional RW or WRW head assembly that includes all tape heads. In such implementations, design considerations may include firmware or software changes to, for example, microprocessor controller 106 to accommodate read after write verification and rewrites of bad data blocks. Other accommodations may include changes in tape block size.

Figure 5:
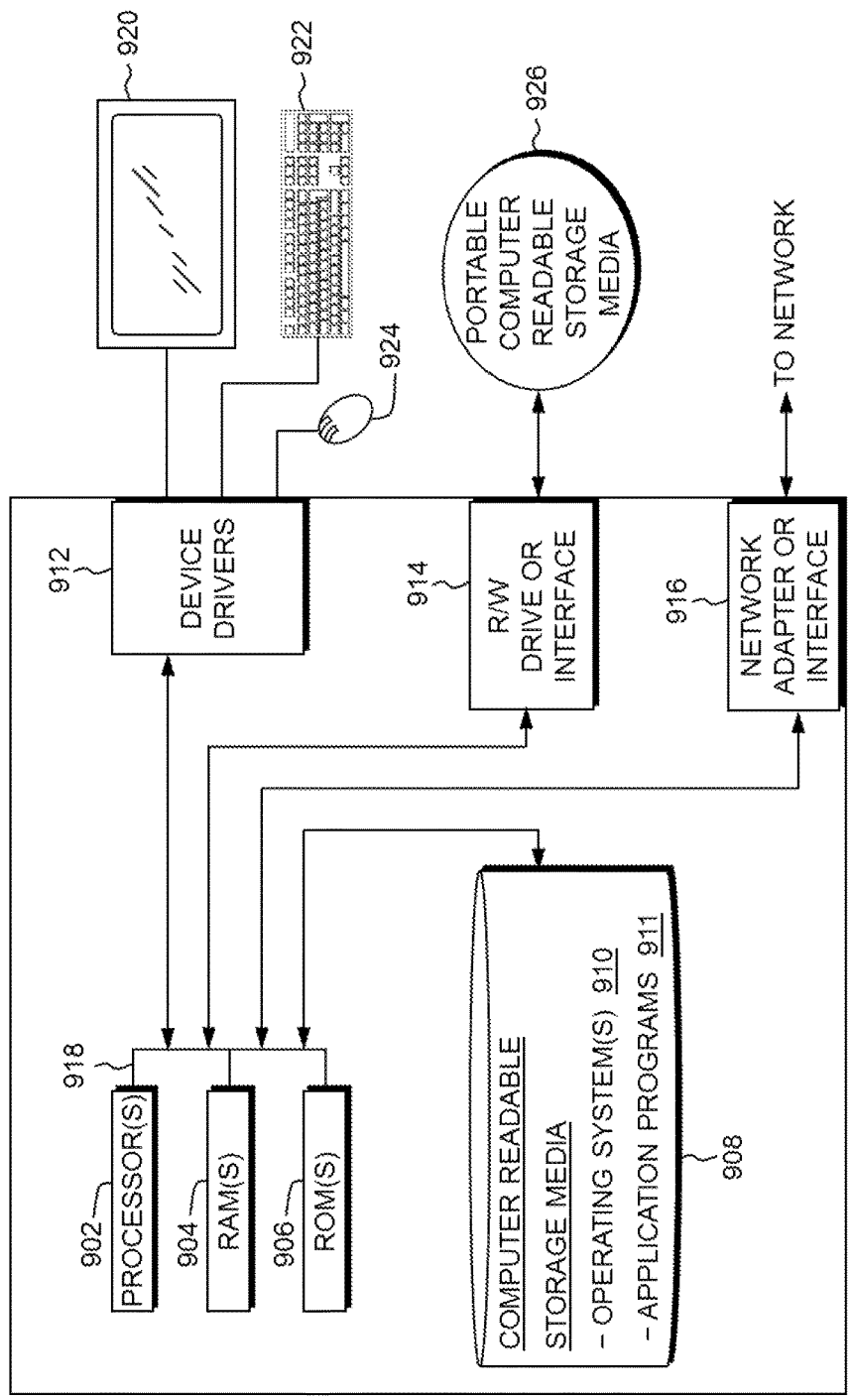
FIG. 5 depicts a block diagram of components of the host CPU of FIG. 1, in accordance with an embodiment of the present invention.

FIG. 5 depicts a block diagram of components of host CPU 102 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Host CPU 102 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host CPU 102 may also include a R/W drive or interface 914 to read from and write to one or more portable computer readable storage media 926. Application programs 911 on host CPU 102 may be stored on one or more of the portable computer readable storage media 926, read via the respective R/W drive or interface 914 and loaded into the respective computer readable storage media 908.

Host CPU 102 may also include a network adapter or interface 916, such as a TCP/IP adapter card or wireless communication adapter (such as a 4G wireless communication adapter using OFDMA technology). Application programs 911 on computing device 106 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Host CPU 102 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A tape appliance comprising:
 a first tape head module;
 a second tape head module; and
 a guide surface that includes first and second slots, the first and second tape head modules being disposed within the first and second slots, respectively, for engaging a tape;
 the guide surface configured such that as the tape moves in first and reverse directions of longitudinal tape travel, the tape wraps about the guide surface, and at least two non-overlapping wrap positions of the tape engage the first slot, and at least one wrap position of the tape engages the second slot;
 when the tape travel is in the first longitudinal direction, the first and second tape head modules are positioned within the first and second slots, respectively, such that the first tape head module is the leading module; and
 when the tape travel is in the reverse longitudinal direction, the first and second tape head modules are positioned within the first and second slots, respectively, such that the first tape head module remains the leading module.

2. A tape guide assembly for use in a tape appliance, the tape appliance including first and second tape head modules, the tape guide assembly comprising:
 a guide surface that includes first and second slots, the first and second tape head modules being disposed within the first and second slots, respectively, for engaging a tape;
 the guide surface configured such that as the tape moves in first and reverse directions of longitudinal tape travel, the tape wraps about the guide surface, and at least two non-overlapping wrap positions of the tape engage the first slot, and at least one wrap position of the tape engages the second slot;
 when the tape travel is in the first longitudinal direction, the first and second tape head modules are positioned within the first and second slots, respectively, such that the first tape head module is the leading module; and
 when the tape travel is in the reverse longitudinal direction, the first and second tape head modules are positioned within the first and second slots, respectively, such that the first tape head module remains the leading module.

* * * * *